W. P. JACKSON.
MOTOR CONTROL SYSTEM.
APPLICATION FILED MAR. 7, 1916.
1,216,126.
Patented Feb. 13, 1917.
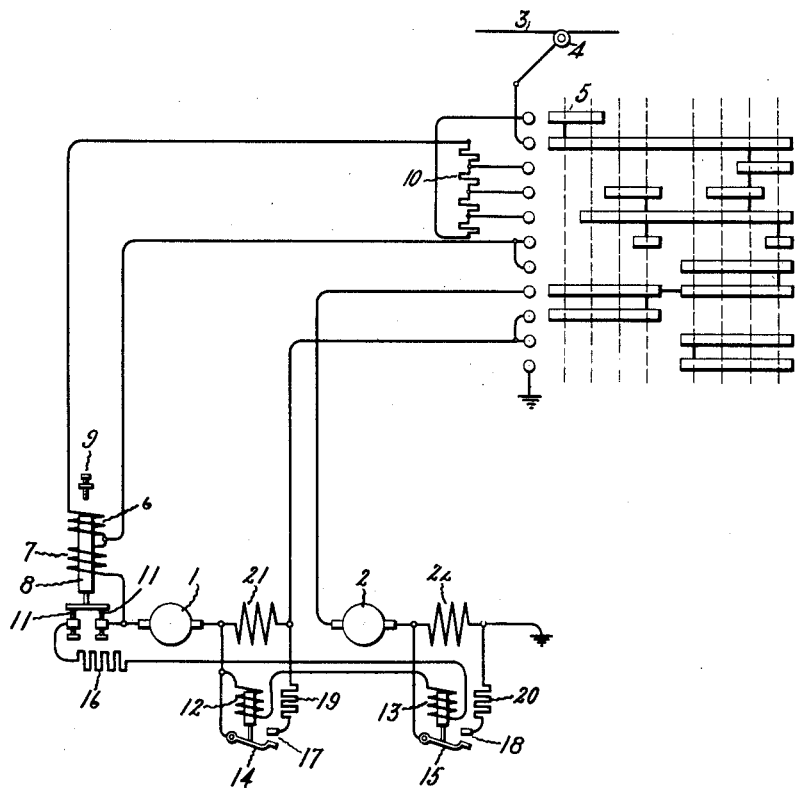
Inventor:
William P. Jackson
by
His Attorney.

UNITED STATES PATENT OFFICE.

WILLIAM P. JACKSON, OF OAKLAND, CALIFORNIA, ASSIGNOR TO GENERAL ELECTRIC COMPANY, A CORPORATION OF NEW YORK.

MOTOR-CONTROL SYSTEM.

1,216,126.      Specification of Letters Patent.      Patented Feb. 13, 1917.

Application filed March 7, 1916. Serial No. 82,590.

*To all whom it may concern:*

Be it known that I, WILLIAM P. JACKSON, a citizen of the United States, residing at Oakland, county of Alameda, State of California, have invented certain new and useful Improvements in Motor-Control Systems, of which the following is a specification.

My present invention relates to a system of speed control for direct current series motors, and more especially to a system in which the field strength of the motor or motors is automatically reduced when a certain predetermined speed is reached and the motor speed is thereby further increased.

In a prior Patent No. 1,077,717 granted to me on November 4, 1913, I have shown and described a system of the above type in which a switch responsive to current in the motor circuit controls a second switch which is responsive to the counter electromotive force across the armature terminals. The operating winding of the first switch is so adjusted that it will be moved to its open position when the motor circuit is closed at the controller and will be held in its open position until, as the motor accelerates, the current falls to a predetermined value. The operating winding of the second switch is connected across the motor armature by the closure of the first switch, and its operating winding is so adjusted that the switch will close only when the counter electromotive force at the armature terminals, and therefore the speed of the motor, reaches a predetermined value. The second switch operates to cut out a portion of the field turns of the motor, or to shunt the field circuit by a resistance and thereby causes a further increase in the speed of the motor automatically independent of the manual operation of the controller. This switch, however, is arranged to become operative only in case the motor has reached a predetermined speed and the current in the motor circuit has fallen to a predetermined value. I have found, in the operation of a system such as that described in my patent, that it is possible for the motorman to hold his controller on a resistance point until such a running speed has been attained that the means for automatically weakening the motor field is operated. This is objectionable because the weakening of the motor field reduces its torque per ampere, and if the field is weakened before all the resistance is cut out it means that in the further acceleration as the remaining resistance is cut out, the motor will take an excessive current from the line.

The object of my invention is to overcome the above disadvantage and at the same time provide a system which is adapted for operation with a series parallel control.

In carrying out my invention I provide a switch or switches responsive to the current in the motor circuit and the counter electromotive force across the armature terminals of one of the motors which operate in a manner similar to that set forth in my prior patent. In addition I provide means responsive to current in the motor circuit which prevents the automatic field reducing means from operating until all of the resistance has been cut out of the motor circuit. In applying my invention to the series parallel control of a plurality of motors, I preferably design the apparatus so that the switches for shunting or tapping the motor fields will not close until the controller has reached its full parallel position and so that they will be opened again when the controller is moved from the full parallel toward the series position as soon as resistance is cut back into the motor circuit by the movement of the controller handle.

My invention will best be understood by reference to the following description taken in connection with the accompanying drawing, in which I have indicated diagrammatically one way in which my invention may be carried into effect. As indicated in the drawing, current for the operation of the motors 1 and 2 is obtained from the line conductor 3 by means of a trolley 4, and the usual steps in starting the motors in series and changing them to parallel operation may be carried out by means of a series parallel controller which may be of any desired type. For the purpose of illustrating my invention I have shown in the drawing a diagrammatic representation of a controller 5 of the drum type comprising stationary contact fingers, indicated by the small circles, to which the motor circuits and the controlling resistance are connected, and movable contacts, indicated by the rectangles at the right, which are suitably interconnected, as shown, and which operate in conjunction with the fixed contact fingers to make the necessary changes in the motor circuits in a manner which is so well understood that it requires no detailed description. It will be seen by an inspection of the drawing that when the controller is thrown to the first starting point the magnetizing coils 6 and 7 which control the operation of switch 8 will both be in series with the two motors, and as a result the switch 8 will be drawn up against the stop 9. The coil 7 is adjusted, as in the system shown in my patent, to prevent the switch 8 from closing until the current in the motor circuit falls to a predetermined value when it alone is connected in the circuit and the coil 6 is adjusted so that it operates in conjunction with coil 7 to prevent the switch 8 from closing, irrespective of the value of the current in the motor circuit, until all the starting resistance 10 has been cut out. When the starting resistance 10 has been cut out there will be no current through coil 6 and switch 8 will be held only by coil 7. When the current in coil 7 falls to a predetermined value the switch will close contacts 11, thereby connecting the magnetizing coils 12 and 13 of switches 14 and 15 in shunt to the armature of motor 1. This may occur when the motors are in full series and also when they are connected in full parallel. With the motors connected in series, however, the voltage across the armature of the motor 1 will be somewhat less than one-half of the line voltage, and these coils may be so adjusted or the circuit in which they are included may be so adjusted by means of a series resistance 16 that they will not close the switches until the potential applied to them is more than one-half the line potential.

When the controller is moved to the first parallel position the coil 6 is again energized and opens switch 8, holding the same open until the last resistance step is cut out in the parallel position. When in this position the motors have speeded up so that the current in coil 7 has fallen to the predetermined value the switch 8 will close and connect coils 12 and 13 in shunt to the armature of motor 1. When the motors have speeded up to a point where the voltage across the armature of motor 1 is sufficient to operate the switches 14 and 15, contacts 17 and 18 will be closed, connecting resistances 19 and 20 in shunt to the series fields 21 and 22, thereby weakening these fields and allowing the motor speed to increase still more. Coil 6 is also preferably so designed that, as soon as the controller is moved back from the full parallel toward the series position and resistance again cut into the motor circuit, switch 8 will be opened and the field reducing means be thereby automatically rendered inoperative. It will of course be understood that the field strength may be reduced by cutting out a portion of the turns in the field as well as by shunting the field by resistance, as explained in my patent above referred to. I have thus provided means which will prevent the field of the motor from being weakened until all the resistance has been cut out of the motor circuit both in the series and in the parallel connection of the motors, and as explained above, I may prevent the field from being weakened until the motors have been connected in parallel and all the resistance has been cut out by proper adjustment of the magnetizing coils 12 and 13, or of the circuit in which they are included.

While I have illustrated and described only one embodiment of my invention, I do not wish to be limited to the particular arrangement shown as it will be apparent that many modifications therein may be made without departing from the scope of my invention as set forth in the appended claims.

What I claim as new and desire to secure by Letters Patent of the United States, is:—

1. The combination in a motor control system of a motor having a series field, a source of current for said motor, a starting resistance for said motor, means for connecting the starting resistance in series with said motor and for cutting the same out of circuit, means for reducing the field strength of said motor, means responsive to the current in the motor circuit for operatively connecting the field reducing means in shunt to the motor armature when the current in the motor circuit falls to a predetermined value, and means responsive to the current through the starting resistance for preventing the connection of the field reducing means in shunt to the motor armature until the starting resistance has been cut out of circuit.

2. The combination in a motor control system of a motor having a series field, a source of current for said motor, a starting resistance for said motor, means for connecting the starting resistance in series with said motor and for cutting the same out of circuit, a switch responsive to the current in the motor circuit, a second switch having a magnetizing coil which is connected in shunt to the armature of said motor when the first switch is operated by reason of the current in the motor circuit falling to a predetermined value, means controlled by the second switch and put into operation when the voltage across the armature of said motor exceeds a predetermined value, for reducing the ampere turns in the series field and a magnetizing coil responsive to current in the starting resistance for preventing the first switch from operating until the starting resistance has been cut out of circuit.

3. The combination in a motor control system of a motor having a series field, a source of current for said motor, a starting resistance for said motor, means for connecting the starting resistance in series with said motor and for cutting the same out of circuit, a switch responsive to current in the motor circuit, a second switch having a magnetizing coil which is connected in shunt to the armature of said motor when the first switch operates by reason of the current in the motor circuit falling to a predetermined value, means controlled by the operation of the second switch for reducing the ampere turns in the series field, and means for preventing the first switch from operating until the starting resistance has been cut out of circuit.

4. The combination in a motor control system of a motor having a series field, a source of current for said motor, a starting resistance for said motor, means for connecting the starting resistance in series with said motor and for cutting the same out of circuit, means responsive to the voltage across the armature of said motor for reducing the ampere turns in the series field, means responsive to the current in the motor circuit for connecting the first mentioned means in shunt to the motor armature when the current in the motor circuit falls to a predetermined value, and means for preventing the operation of the second mentioned means until the starting resistance has been cut out of circuit.

5. The combination in a motor control system of a plurality of motors having series fields, a source of current for said motors, a starting resistance for said motors, means for connecting the starting resistance in series with said motors and for cutting the same out of circuit, means responsive to the voltage across the armature of one of said motors for reducing the ampere turns in the series fields of both motors when the voltage exceeds a predetermined value, a switch responsive to the current in the circuit of one of said motors for connecting said field reducing means in shunt to the armature of one of said motors when the current in the motor circuit falls to a predetermined value and means responsive to current in the starting resistance for preventing the switch from operating until the starting resistance has been cut out of circuit.

6. The combination in a motor control system of a plurality of motors having series fields, a source of current for said motors, a starting resistance for said motors, means for connecting the starting resistance in series with said motors, for cutting the starting resistance out of circuit and for connecting the motors in series or in parallel, circuit connections including switches responsive to the voltage across the armature of one of said motors for reducing the number of ampere turns in the series fields of said motors, said switches being adjusted so that they will not operate when the motors are connected in series, a second switch responsive to the current in the motor circuit for connecting the operating windings of the first mentioned switches in shunt with the armature of one of said motors when the current in the motor circuit falls to a predetermined value, and means responsive to the current through the starting resistance for preventing the operation of the second switch until the starting resistance has been cut out of circuit.

In witness whereof, I have hereunto set my hand this 1st day of March, 1916.

WILLIAM P. JACKSON.